C. R. GOUDIE.
BUILDING STRUCTURE.
APPLICATION FILED SEPT. 3, 1918.
1,363,407.
Patented Dec. 28, 1920.
7 SHEETS—SHEET 1.
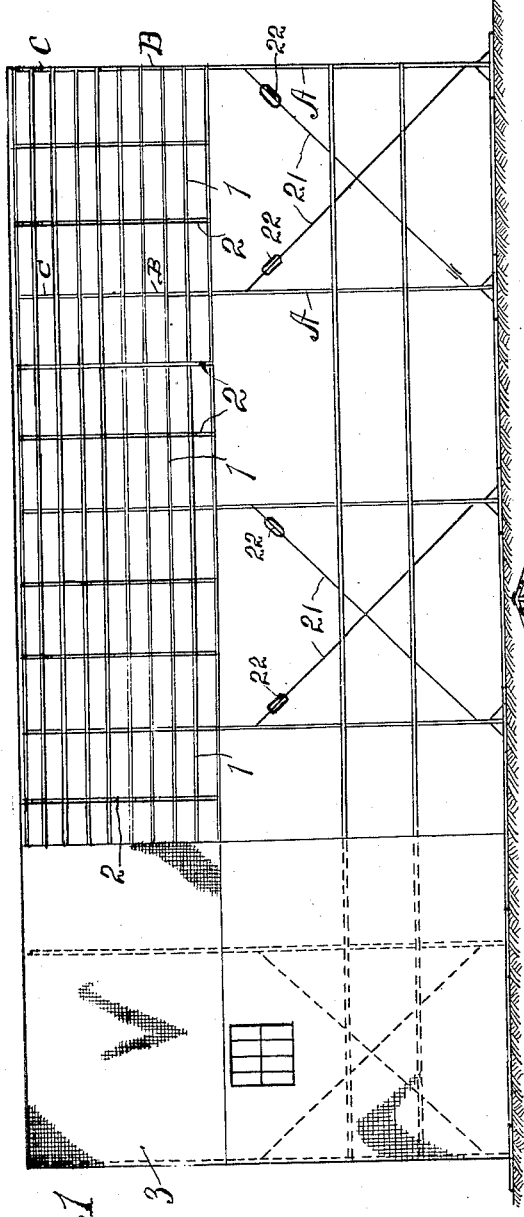
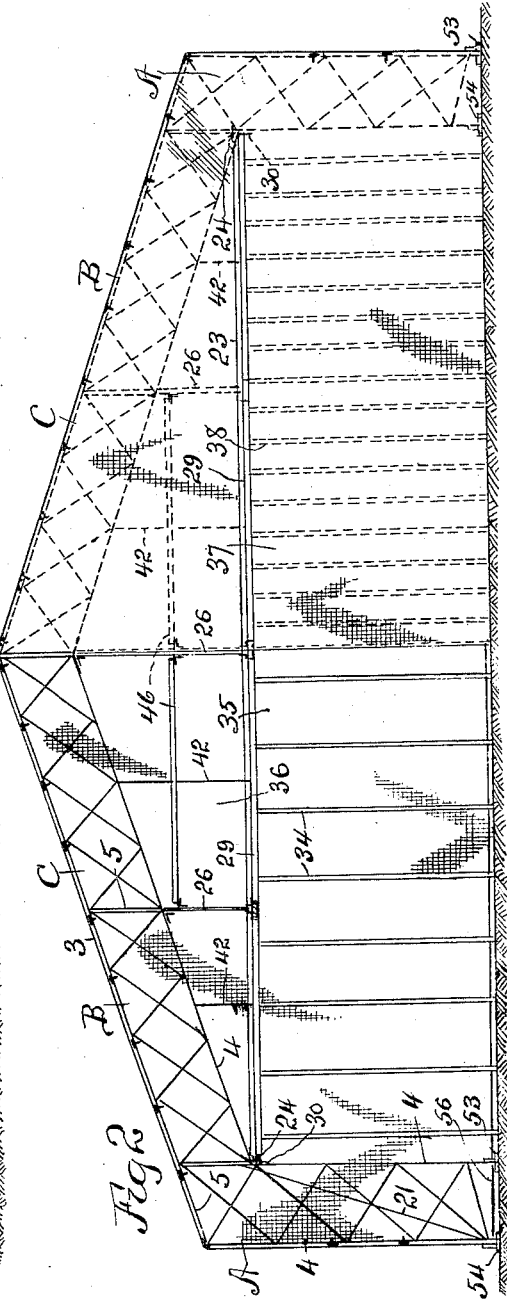
INVENTOR.
Charles R. Goudie
BY Warren H. House
His ATTORNEY
WITNESS:
R. E. Hamilton

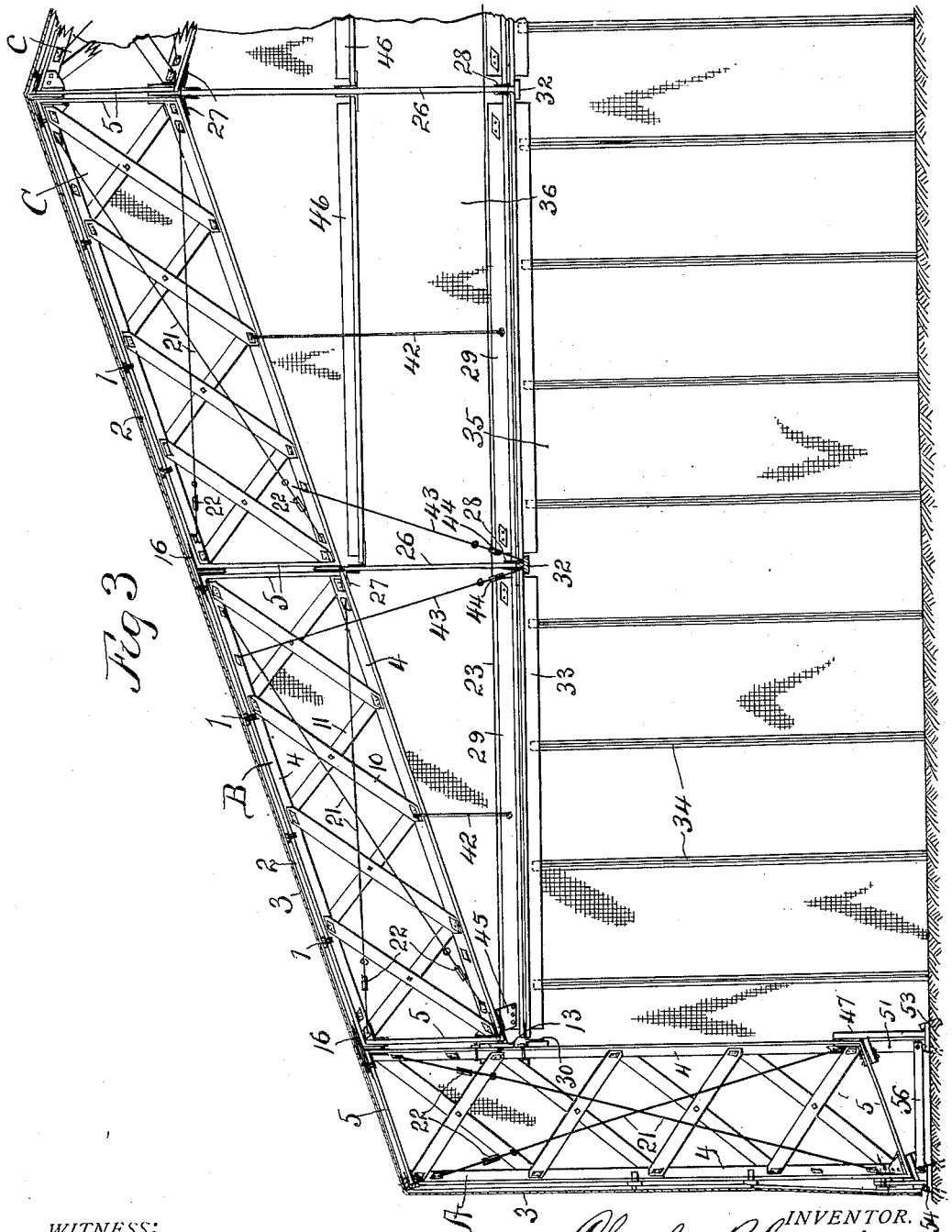

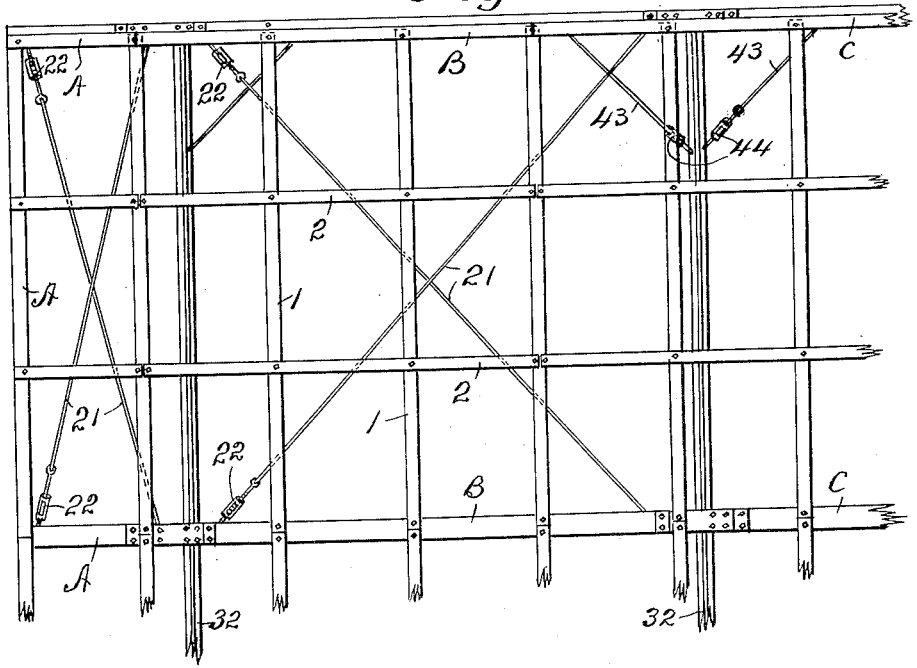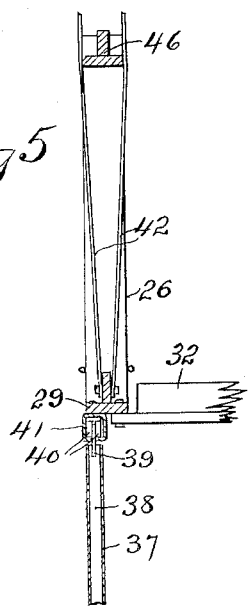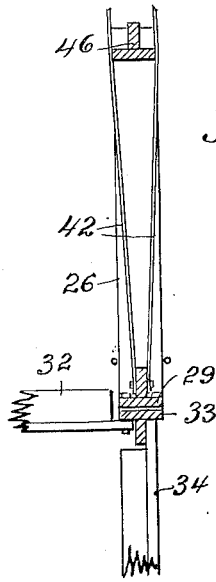

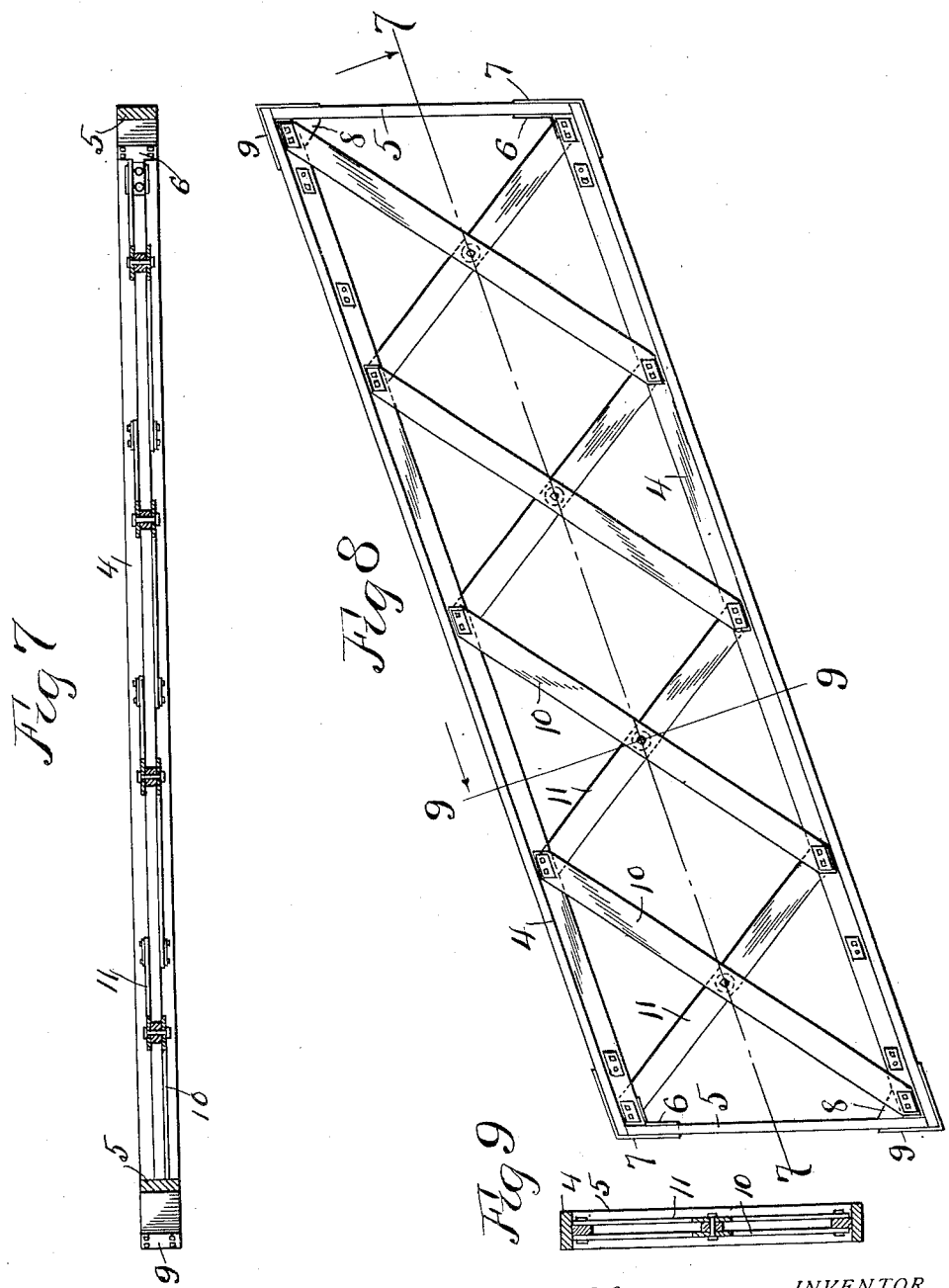

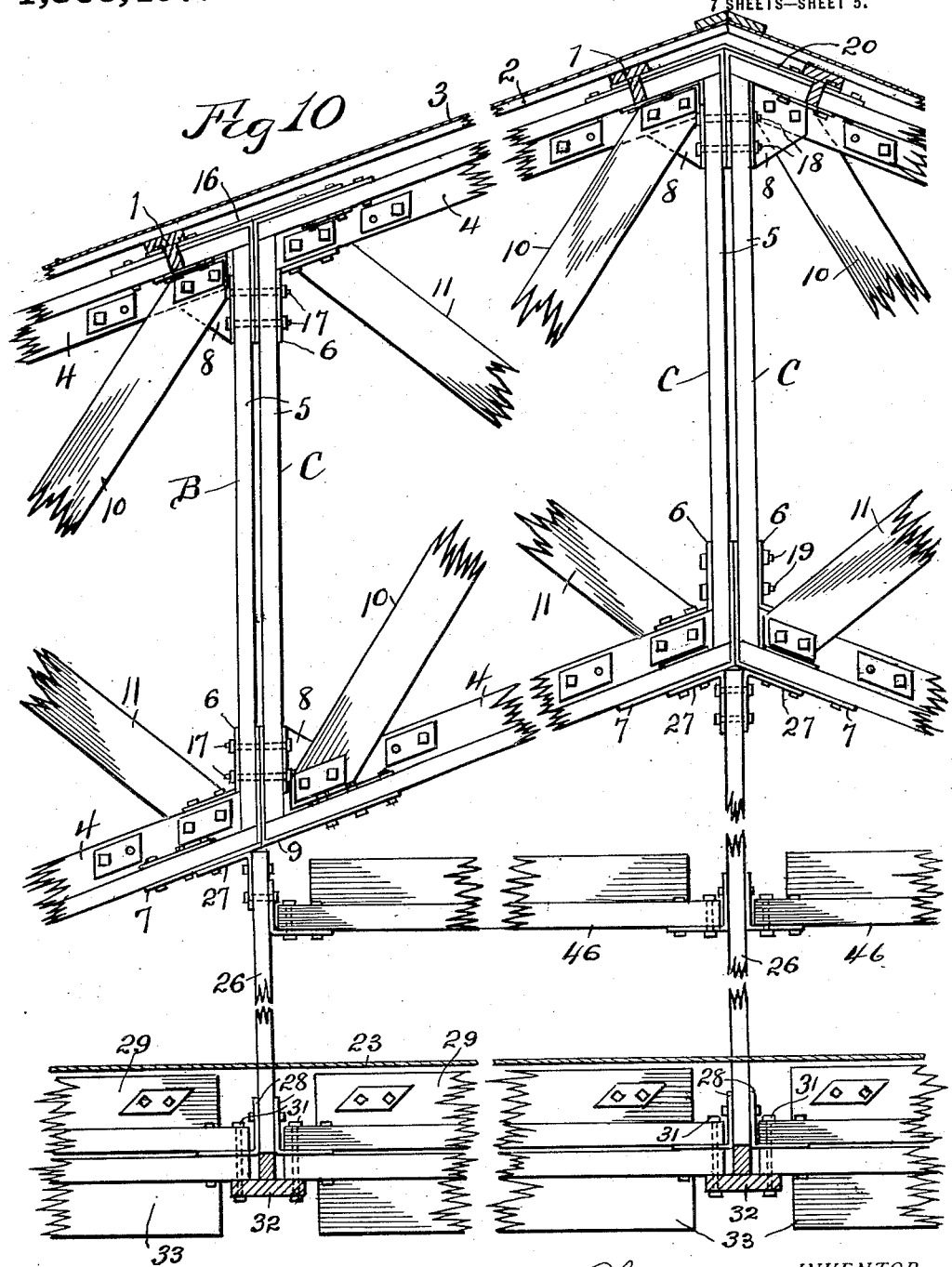

C. R. GOUDIE.
BUILDING STRUCTURE.
APPLICATION FILED SEPT. 3, 1918.

1,363,407.

Patented Dec. 28, 1920.
7 SHEETS—SHEET 6.

WITNESS:
R.E.Hamilton

INVENTOR.
Charles R Goudie
BY
Warren D. House
His ATTORNEY

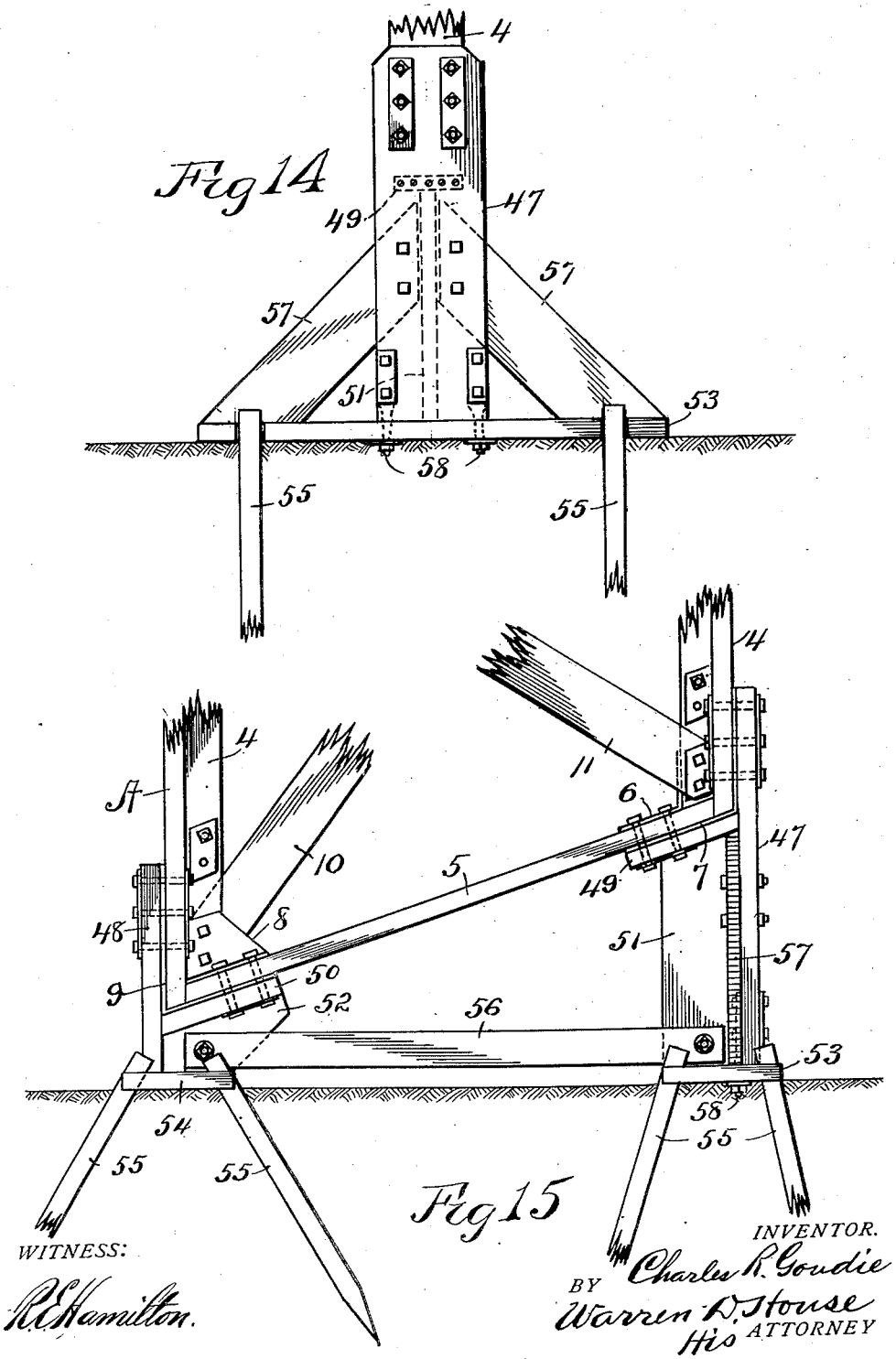

UNITED STATES PATENT OFFICE.

CHARLES R. GOUDIE, OF KANSAS CITY, MISSOURI, ASSIGNOR OF ONE-FOURTH TO LE ROY GOUDIE, ONE-FOURTH TO GEORGE A. GOUDIE, AND ONE-FOURTH TO HARRY G. CARNIE, ALL OF KANSAS CITY, MISSOURI.

BUILDING STRUCTURE.

1,363,407.

Specification of Letters Patent. Patented Dec. 28, 1920.

Application filed September 3, 1918. Serial No. 252,440.

*To all whom it may concern:*

Be it known that I, CHARLES R. GOUDIE, a citizen of the United States, residing at Kansas City, in the county of Jackson and State of Missouri, have invented a certain new and useful Improvement in Building Structures, of which the following is a specification.

My invention relates to improvements in building structures, particularly to the frame work of buildings. It is well adapted for use in the construction of large buildings, such as are used for hangars, depots for passengers or storage, or similar structures.

One of the objects of my invention is to provide a novel means by which buildings may be very quickly and substantially built of any desired height, width and length.

A further object of my invention is the provision of a structure which will provide a maximum of strength and durability at a minimum of cost in material and labor.

Still another object of my invention is the provision of a novel sectional truss, which instead of being built piece by piece, where it is to be used, is composed of unitary sections, preferably but not necessarily, duplicates of each other, and which require merely to be bolted together to form the complete truss.

Another object of my invention is the provision of a novel truss section, which is adapted for use at any point in the truss either as a roof section or as a supporting wall section, and which is, preferably, a self-contained frame unit of rhomboid form. This form particularly well adapts the truss unit for use in connection with similar units in the construction of buildings having sloping roofs.

My invention provides further a novel building frame comprising sectional trusses connected by purlins, each truss consisting of duplicate truss sections fastened together.

My invention provides still further a novel building frame comprising sectional trusses connected with purlins, each truss comprising duplicate self-contained duplicate sections fastened together and constituting respectively a roof section and a wall section.

Other novel features of my invention are hereinafter fully described and claimed.

In the accompanying drawings, which illustrate the preferred embodiment of my invention.

Figure 1 is a side elevation of a partly completed building which embodies my invention.

Fig. 2 is an end view of the same, one half of each end being shown, and some of the canvas covering removed.

Fig. 3 is an enlarged vertical cross sectional view of a portion of the building shown in Figs. 1 and 2.

Fig. 4 is a top view of a portion of the frame work of the building shown in Fig. 1.

Fig. 5 is an enlarged fragmental vertical sectional view of a portion of one end of the frame work of the building.

Fig. 6 is a view similar to Fig. 4 and illustrates a portion of the opposite or closed end of the frame work.

Fig. 7 is a longitudinal sectional view on the line 7—7 of Fig. 8.

Fig. 8 is a side view of one of the self-contained unitary truss sections.

Fig. 9 is a cross section on the line 9—9 of Fig. 8.

Fig. 10 is an enlarged vertical sectional view broken away of a portion of the roof and one end of the building.

Figs. 14 and 15 are elevation views, looking respectively in two directions of a portion of one of the wall sections and its supporting and anchoring means.

Similar reference characters designate similar parts in the different views.

Figure 11:
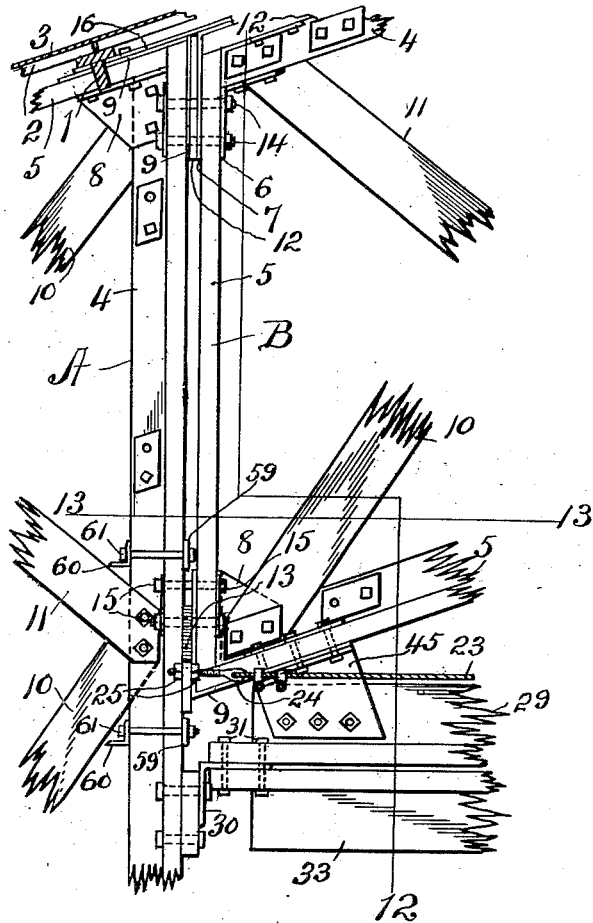
Fig. 11 is an enlarged fragmental vertical sectional view showing portions of a roof section and a wall section and parts connected therewith.

Referring to Figs. 1 and 2, the framework of the building is composed of a plurality of trusses, each comprising wall sections, outer roof sections, and inner roof sections, which for convenience in distinguishing them are respectively designated by the characters A, B and C. The truss sections are, preferably, and as shown, duplicates of each other, each being a self contained framed unit adapted to be used at any place in the truss, either as a roof or a wall section.

The trusses are connected by purlins 1 of any desired number, and which support rafters 2, upon which may be fastened a canvas cover 3, which covers the roof, sides and all of one end and a portion of the other end of the building.

As above stated, each of the truss sections A, B and C is a duplicate of the others, so that a description of one will answer for all.

Referring now to Figs. 3, 7, 8 and 9, it will be observed that the truss section has the form of a rhomboid, the sides of which consist of two parallel longitudinal members 4, which are, preferably T shaped in cross section, and which are secured at their ends to the ends of two end members 5, which are oblique to the members 4.

Reinforcing angle plates 6 connect the members 4 and 5 at the inner obtuse angular corners of the section, and reinforcing angle plates 7 are secured to the outer obtuse corners of the section. Reinforcing angle plates 8 connect the members 4 and 5 at the inner acute corners of the section, and angle plates 9 connect the members at their outer acute corners.

Crossed braces 10 and 11 are secured respectively to opposite sides of the members 4 and to each other.

The section just described is a self-contained unitary framed structure, which constitutes an article of manufacture, duplicates of which may be manufactured in large quantities, held in storage ready for use, and then transported in numbers sufficient to make trusses of the number and dimensions required for the particular building which is to be erected.

If the height of the sides of the building corresponds substantially to the length of one truss section, as shown in the drawings, then each truss is provided with two wall sections A, which are upright and are the end portions of the truss and which have respectively secured to their inner side members 4 the outer ends of the roof sections B, the inner ends of which are secured to the outer ends of the roof sections C, the inner ends of which are secured to each other at the middle or ridge portion of the roof. The number of roof sections employed will depend, of course, upon the width of the building. Four roof sections are shown in the drawings.

The rhomboid form of the truss section enables the convenient construction of a pitch roof. It also permits the upper ends of the wall sections to lie in the same planes as the upper sides of the adjacent roof sections, and the ends of the roof sections are permitted, by reason of this form, to be close to and parallel with the inner sides of the wall sections, so as to be easily bolted or otherwise fastened thereto. As the upper ends of the wall sections A lie in the same planes as the upper sides of the adjacent roof sections B, the canvas cover 3 has the same pitch from the ridge of the roof to the outer sides of the walls.

I will now describe how the wall sections A are fastened to the roof sections B.

Referring to Figs. 3 and 11 to 13, 12 and 13 designate respectively two spacing plates located between the sections A and B and secured thereto by the bolts 14 and 15. A clamping plate 16 is secured to the upper sides of the sections A and B, Figs. 3 and 11, and crosses the joint between said sections. A similar plate 16 is similarly connected to the sections B and C on the upper sides thereof, see Figs. 3 and 10.

As shown in Fig. 10, the adjacent ends of the sections B and C are secured together by means of bolts 17, which pass through the adjacent members 5 and the angle plates 6 and 8. As shown in Fig. 10, the inner ends of the sections C are fastened together, by bolts 18, which pass through the end members 5 and adjacent angle plates 8 and the bolts 19 which pass through the members 5 and the adjacent angle plates 6.

A cap plate 20, Fig. 10, crosses the joint between and is secured to the upper sides of the sections C.

Cross braces 21, each of which is provided with a turn buckle 22, connect the sections A of adjacent trusses. The same is true of sections B and C, see Figs. 1, 3 and 4.

Two horizontal cables 23 are attached at their ends respectively to screw bolts 24, two of which extend through each plate 13 and are provided at opposite sides of said plate with nuts 25, see Figs. 2, 3 and 11 to 13.

As shown in Figs. 3, 10 and 6, a series of depending bars 26 are secured to and supported by angle irons 27, which are fastened to the under side of each of the end trusses. Secured to the lower ends of the bars 26 are angle irons 28, Fig. 10, which support at their ends horizontal T-bars 29, the outer ends of the outer ones of said bars 29 being supported on brackets or angle irons 30, secured to the inner sides of the adjacent wall sections A, see Figs. 2, 3 and 11.

Supported by means of vertical bolts 31 which pass through the bars 29 and angle irons 28 and 30 are longitudinal horizontal T-bars 32, which support horizontal transverse bars 33, also T-shaped in cross section, provided only at the closed end of the building and which have attached to them vertical T-bars 34, Figs. 2, 3 and 6, to which are attached ends 35, which with canvas 36 fastened to the bars 29 and to the end roof sections B and C close one end of the building.

The other end of the building has the portion above the bars 29 closed by canvas 36, and by means of a collapsible curtain comprising canvas 37 secured to vertical bars 38, to the upper ends of which are secured hangers 39 provided with rollers 40, Fig. 5, which run in a tubular horizontal track 41, which is secured to the under sides of the bars 29 at the adjacent end of the building. The curtain may be collapsed in the usual manner by sliding the bars 38 toward one side of the building.

For holding the canvas 36 vertical members 42, such as ropes or wires, may be disposed at each side of the canvas and are secured at their lower ends to the bars 29 and at their upper ends to the adjacent truss.

Brace members 43, which include turn buckles 44 are attached to each member 32 and diverge upwardly therefrom and are secured to an adjacent truss, Figs. 3 and 4.

As shown in Figs. 3 and 11 angle plates 45 may be secured to the outer ends of the outer bars 29 and to the under side of the adjacent truss for more securely supporting and securing the bars 29.

As shown in Figs. 2, 3, 5 and 6 horizontal bracing bars 46 may be secured to and between the depending bars 26.

For supporting and firmly anchoring each wall truss section A, I provide the following described means, see Figs. 3, 14 and 15.

Bolted rigidly respectively to the inner and outer sides of each truss section A are two vertical members 47 and 48. Secured to the under side of the section are two members 49 and 50, which are respectively supported upon two vertical members 51 and 52, which, with the members 47 and 48 respectively rest upon the upper sides of two planks 53 and 54, which rest upon the ground and are provided each at opposite longitudinal edges with notches through which respectively extend obliquely disposed stakes 55, which are driven into the ground, as shown in Figs. 14 and 15.

A transverse bar 56 has its ends respectively secured to the members 51 and 52. Two oblique braces 57 are secured to the member 47 and to the plank 53. The member 47 is secured by vertical bolts 58 to the plank 53.

Figure 12:
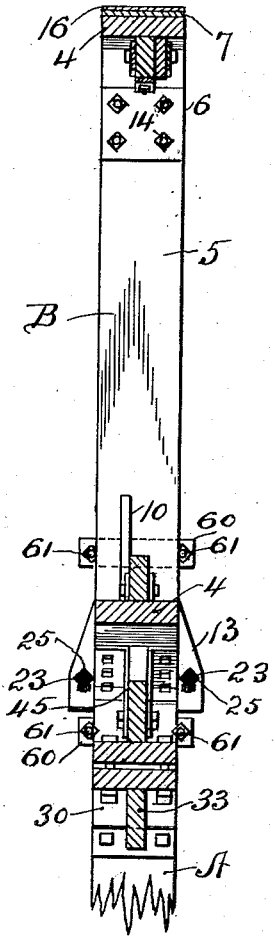
Fig. 12 is a vertical sectional view on the line 12—12 of Fig. 11.
Figure 13:
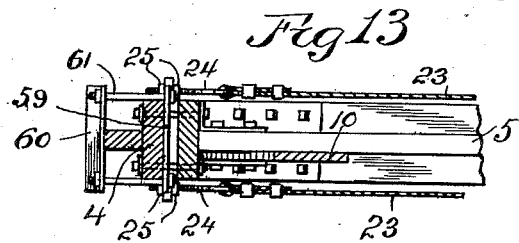
Fig. 13 is a cross section on the line 13—13 of Fig. 11.

To bind the parts of each inner member 4 of the wall sections A together to resist the pull of the cables 23, each of the said members 4 of the wall sections is embraced upon its inner and its outer sides by two clamping plates 59 and 60 arranged in opposite relationship to each other above the cables 23. A similar set of plates 59 and 60 are similarly located below the cables. Bolts 61 connect the plates 59 and 60, as best shown in Figs. 12, 11 and 13. To make it rigid, the plate 60 of each pair is an angle plate.

In the operation of my invention, the duplicate truss sections A, B and C are transported to the place where the building is to be erected, and then assembled by the means and mode of operation already described to form the different trusses, the latter being arranged and anchored in their respective positions, after which the bracing cables 21 and 23 are attached to the trusses as described, and the purlins 1 and rafters 2 are mounted and secured in position.

The bars 29 and 33 are then secured in their respective positions on the end trusses, as described hereinbefore, after which the canvas cover 3, 35 and 36 may be applied to the frame work, as has been explained. The track 41 and curtain 37 may then be hung from the adjacent bars 29.

While my invention is particularly well adapted for the employment principally of wood in the construction of the truss sections and other parts of a building, it is also adapted for the advantageous use of steel, iron and other materials.

By means of the duplicate truss sections, which are self contained and ready for instant application without machining, fitting or other preparatory labor, and which are interchangeably reversible, a building of any desired dimensions may be quickly and economically constructed, and which will have great strength, rigidity and durability. Aside from the trusses, the other parts of the frame work of the building are such as may usually be obtained where the building is to be erected. If desired, such parts as the purlins 1 and the T shaped members 29, 32 and 46, may be kept in stock in duplicate prepared parts, which may be sent with the truss sections to the place where the building is to be erected.

I do not limit my invention to the structure as shown and described, as modifications, within the scope of the appended claims, may be made without departing from the spirit of my invention.

What I claim is:—

1. In building structures, a sectional truss comprising two self contained rhomboid roof sections fastened together end to end and a rhomboid wall section having one side fastened to one end of one of the roof sections.

2. In building structures, a building frame comprising a plurality of self contained sectional trusses, each consisting of inclined rhomboid roof sections fastened together end to end and a wall section fastened at one side to one end of one of the roof sections, the upper end of the wall section and the upper sides of the roof sections being in the same plane, and purlins connecting the roof sections of the adjacent trusses.

3. In building structures, a sectional truss comprising duplicate self contained rhomboid sections including two upright wall sections and inclined roof sections fastened together end to end and to the inner sides of said wall sections.

4. In building structures, a sectional truss comprising duplicate self contained rhomboid sections including two upright wall sections and inclined roof sections fastened together end to end and to the inner sides of the wall sections, the upper ends of the wall sections being each in the same plane as the upper sides of the adjacent roof sections.

In testimony whereof I have signed my name to this specification.

CHARLES R. GOUDIE.